Aug. 9, 1927.
H. R. CARVETH
1,638,471
PROCESS OF REACTING METALS WITH GASES
Filed March 9, 1923
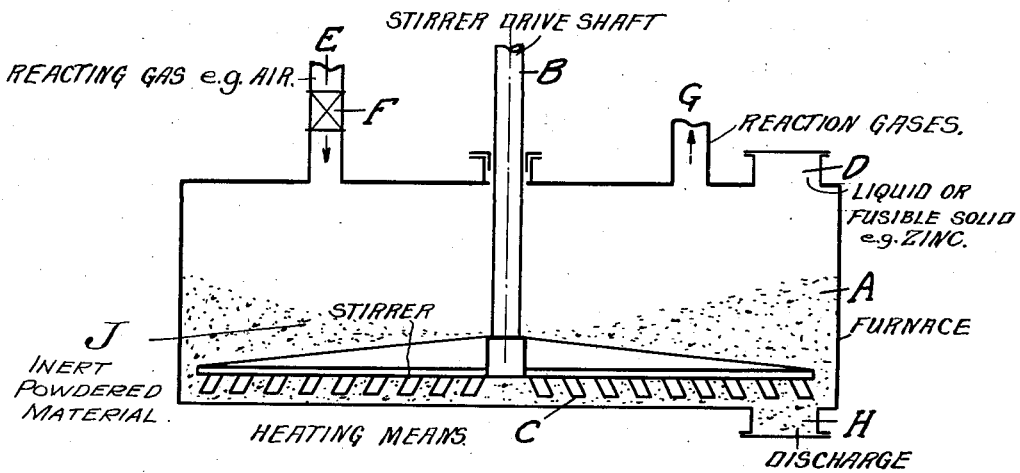
INVENTOR
Hector Russell Carveth
BY
ATTORNEY Patented Aug. 9, 1927.

1,638,471

UNITED STATES PATENT OFFICE.

HECTOR RUSSELL CARVETH, OF NIAGARA FALLS, NEW YORK, ASSIGNOR TO THE ROESSLER & HASSLACHER CHEMICAL COMPANY, OF NEW YORK, N. Y., A CORPORATION OF NEW YORK.

PROCESS OF REACTING METALS WITH GASES.

Application filed March 9, 1923. Serial No. 623,901.

This invention relates to reactions with gases for the formation of a solid product, and has particular reference to exothermic reactions which are ordinarily difficult to control.

The object of the invention is to enable the temperature of such reactions to be satisfactorily controlled for the purpose of obtaining greater uniformity of product and greater yield. Reactions between gases and liquids are commonly effected at the present time by blowing the gas over or through the liquid, with various forms of agitations. If the gas is blown over the liquid the reaction product usually floats on top and prevents access of the gas. If the gas is blown through the liquid the reaction product may in conjunction with the unconverted liquid form a pasty mass which tends to agglomerate, especially if agitation is used. In either case, the surface of liquid exposed to the gas is reduced and the conversion is not uniform and not complete.

Where such a reaction is exothermic, it is practically impossible to control the temperature. The product is not uniform because in a pasty or agglomerated mass overheating occurs locally and cannot be either prevented or controlled. This objection becomes serious where pure reacting materials are employed with the object of obtaining a pure product. While the reacting materials may not attack the container at the normal theoretical temperature of the reaction the actual temperature due to overheating and lack of control frequently rises to such extent that either the materials or the product will attack the container, resulting in impure product.

In order to overcome the foregoing difficulties I have devised the process of this invention wherein the reaction is conducted at a controlled reacting temperature such that overheating does not occur, and producing a more uniform and a more pure product than has heretofore been obtained. A specific example of class or group reaction to which this invention is applicable is that where a pure oxide of metal is to be obtained. The common method is to melt the metal and apply oxygen to it, and the metal bath either becomes coated with oxide which protects the metal from further oxidation, or if the oxygen is blown through the metal the bath becomes pasty, which retards the conversion. Moreover, in neither method is there adequate control of temperature nor prevention of local overheating sufficient to prevent the product from becoming contaminated by the container.

I have discovered that this class or group reaction can be carried out with complete conversion and without loss by volatization of metal or contamination of product by the reaction vessel if the metal be finely divided and mixed with a powderer material inert at the reacting temperature. Such a mixture does not agglomerate or become pasty, and can be treated with oxygen at a controlled rate such as to form the desired oxide at a temperature much lower than is usually required and permitting the desired degree of conversion of the metal. In brief, I finely divide the metal by mixing it with an excess of previously formed oxide so that the mass remains as a powder throughout the process. Simple agitation at all times exposes a maximum surface of metal to the gas, while temperature is controlled by regulation of the gas supply.

In the accompanying drawing is shown a diagram of an apparatus wherein A represents a furnace or retort capable of being externally heated to start the reaction and also under some conditions provided with heat insulation to prevent loss of heat; B is a packed shaft carrying a rotating rake or stirrer C; D is an opening to supply liquid, or solid which will melt; E is a pipe with controlling valve F to supply reacting gas and G is a pipe to carry off reaction gases. J is a reacting mass consisting of a liquid mixed with such excess of pulverulent solid as will maintain the entire mass in a powdered condition. The product is removed at H. The bottom of the retort constitutes a support for the bed of inert material into which the liquid, such as molten metal, is mixed by the stirrer or other agitation. If molten metal is poured in from another vessel, the flow is controlled so as to permit the desired mixing. If a block or pieces of solid metal are put in, they melt on top of the previously placed bed of inert material. In either case, liquid material or metal has little or no contact with the material of the retort in mass, but only contacts if at all, with the material of the retort when in finely divided dilute condition. This results in less contact with the material of the retort and less attack thereon by the liquid material. If desired the liquid can be supplied continuously and the powder mass containing the product can be discharged as it accumulates, forming a continuous process.

As one example, to which the invention is not, however, to be limited, I may mention the formation of zinc oxide by the treatment of molten zinc with oxygen. This is ordinarily performed by passing oxygen over a bath of molten zinc. The oxide is either recovered from the top of the bath or the zinc is vaporized and the oxide caught in settling chambers. The process is objectionable because zinc vapors attack various metals and the resulting zinc oxide is not pure. According to this invention molten zinc is finely divided by being mixed with a larger mass of previously formed zinc oxide and oxygen supplied at the reacting temperature of oxygen and zinc. The percentage of zinc may be as much as the oxide will take up without becoming pasty, but I have found zinc up to 10% satisfactory and 5% preferable. The zinc is premelted and poured into the oxide at the reacting temperature, or melts at such temperature if introduced solid, in either case readily becoming finely divided and absorbed in the mass of oxide and the whole acting as a powder which can be readily agitated. The oxygen is now led into the agitated mass at the reacting temperature with formation of the oxide in a rapid and effective manner because of the large surface of zinc exposed, and at a lower temperature than is ordinarily required because of the fine sub-division of the zinc. Local overheating is thus prevented, and the temperature of the mass as a whole can always be regulated by the supply of gas, so that there is at no time an excessive evolution of heat nor a large contact of molten zinc, or zinc vapors with the materials of the container. Nor is a temperature reached at which the zinc will attack such materials, yet the necessary temperature for the formation of zinc oxide is easily maintained. It may be necessary to start the reaction by applied heat or to supply heat during the reaction in operating with other materials.

An advantage of the process is that there is always a bed of powder present when the solid or liquid metal is introduced so that it does not touch the material of the reacting vessel at such temperature as to attack it or become contaminated by it. Owing to the lower reacting temperature due to the fine subdivision of the metal, and the temperature control by regulation of gas, the yield is increased, and loss of gas and wear on the apparatus are reduced.

Although the oxide is a convenient and preferable inert pulverulent material with which to mix the metal, other materials which are inert at the temperature employed may be used within the scope of this invention, but would require to be separated from the end product.

Zinc and other oxides made by the process of this invention are characterized by increased density and greater purity. The purity is greater both because of less absorption of materials from the container, and also because of less percentage of unconverted zinc, since this process can be carried to complete conversion if desired without damaging the product already made.

Since the process of this invention is a class process applicable to many specific materials which merely require to be selected, as for example, other metal oxides which are desired in a state of purity, it is impracticable to point out the various specific uses of this process, and I intend to claim the same broadly except as required by the appended claims.

I claim:

1. The process consisting in charging a furnace with a mixture of a molten metal and an inert material, said mixture containing not more than 10% of said molten metal, and agitating the mixture while passing reacting gas therethrough at such temperature as to effect reaction between the molten metal and the gas, said temperature being maintained below the fusion point of the product.

2. The process consisting in charging a furnace with a pulverulent mixture of a molten metal and an excess of inert absorbent material composed of the same metal previously combined with a gas, and agitating the mixture while passing more of the same reacting gas therethrough at such temperature as to effect reaction between the metal and the gas, said temperature being maintained below the fusion point of the product.

3. The process consisting in charging a furnace with a pulverulent mixture of a molten metal and an excess of absorbent oxide thereof, and agitating the mixture while passing oxygen therethrough at such temperature as to oxidize the metal, said temperature being maintained below the fusion point of the oxide.

4. The process of oxidizing a metal which consists in mixing the molten metal with such excess of inert pulverulent material as to prevent agglomeration or pastiness when heated to a reacting temperature, said mixture containing not more than 10% of said metal, and supplying oxygen to the mass during agitation at the reacting temperature at such a rate as to control the temperature and effect the reaction at a temperatue above the fusion point of the metal and below that of the inert pulverulent material and of the oxide formed.

5. The process of oxidizing a metal which consists in forming a mixture of the molten metal with such excess of previously formed pulverulent oxide as to prevent agglomeration or pastiness when heated to a reacting temperature, said mixture containing less than 10% of said metal, and supplying oxygen to the mass during agitation at the reacting temperature at such a rate as to control the temperature and effect the reaction at a temperature above the fusion point of the metal and below that of the oxide formed.

6. The process of oxidizing a metal which consists in mixing the molten metal with sufficient inert pulverulent material to maintain the mixture in a powdered condition at the reaction temperature and adding oxygen at such rate as to maintain a reaction temperature below the fusion point of said inert material.

7. The process of oxidizing a metal which consists in mixing the molten metal with sufficient inert pulverulent material to maintain the mixture in a powdered condition, supplying oxygen, and regulating the reacting temperature by the supply of oxygen, said reacting temperature being maintained below the fusion point of the inert material and of the oxide formed.

8. The process of oxidizing a metal which consists in mixing the molten metal with a larger volume of oxid of the metal at a reacting temperature below the melting point of the oxid and in the presence of oxygen.

9. The method of reacting a metal with a gas consisting in mixing approximately 10 parts of molten metal with approximately 90 parts of inert pulverulent material so as to maintain a pulverulent mass containing the metal absorbed on the surfaces of said inert material and then treating with the gas at a temperature below the fusion point of the inert material and the reaction product.

10. The process of producing zinc oxide which consists in absorbing molten zinc in an excess of inert pulverulent material at a reacting temperature and supplying oxygen, the reacting temperature being maintained below the fusion point of the inert material and of the zinc oxide.

11. The process of producing zinc oxide which consists in absorbing molten zinc in an excess of pulverized zinc oxide at a reacting temperature and supplying oxygen, said temperature being maintained below the fusion point of zinc oxide.

12. The process of producing zinc oxide which consists in absorbing molten zinc in an excess of inert pulverulent material at a reacting temperature and supplying oxygen at such rate as to maintain a substantially constant reacting temperature below the varporization point of zinc, and below the fusion point of zinc oxide.

13. The method of producing a metal oxide which consists in mixing up to 10 parts of molten metal with 90 or more parts oxide thereof so as to maintain a pulverulent mass containing the metal absorbed on the surfaces of said oxide and then treating with an oxygen containing gas at a temperature between the fusion point of the metal and of the oxide.

Signed at Perth Amboy, in the county of Middlesex and State of New Jersey this 7th day of March, A. D. 1923.

HECTOR RUSSELL CARVETH.